US00RE49558E

(19) United States
(12) Reissued Patent
Nyaggah

(10) Patent Number: US RE49,558 E
(45) Date of Reissued Patent: Jun. 27, 2023

(54) BRACELET

(71) Applicant: RASTACLAT, LLC, Long Beach, CA (US)

(72) Inventor: Daniel Kasidi Nyaggah, Long Beach, CA (US)

(73) Assignee: Rastaclat, LLC, Long Beach, CA (US)

(21) Appl. No.: 29/823,751

(22) Filed: Jan. 19, 2022

Related U.S. Patent Documents

Reissue of:
(64) Patent No.: Des. 873,165
Issued: Jan. 21, 2020
Appl. No.: 29/666,512
Filed: Oct. 12, 2018

(51) LOC (14) Cl. ..... 11-01
(52) U.S. Cl.
USPC ..... D11/5
(58) Field of Classification Search
USPC ..... D11/2, 3, 4, 5, 6, 7, 8, 9, 10; D2/978; D28/41

(Continued)

(56) References Cited

U.S. PATENT DOCUMENTS

D108,250 S * 2/1938 Sternberg ..... D11/26
D114,516 S * 4/1939 Dick ..... D11/9

(Continued)

OTHER PUBLICATIONS

Rastaclat Facebook page, "Bracelet" published on Oct. 13, 2017, online. Site visited on Jul. 22, 2020. Internet URL:<"https:// www.facebook.com/RastaclatBrand/photos/a.248566711904028/1504367166323970/"> (Year: 2017).

(Continued)

*Primary Examiner* — Philip S Hyder

(74) *Attorney, Agent, or Firm* — Buchalter; Cecily Anne O'Regan

(57) CLAIM

The ornamental design for a bracelet, as shown and described.

DESCRIPTION

FIG. 1 is a front left top perspective view of a bracelet [showing my new design];
FIG. 2 is a front elevation view of the bracelet illustrated in FIG. 1;
FIG. 3 is a rear elevation view of the bracelet illustrated in FIG. 1;
FIG. 4 is a top plan view of the bracelet illustrated in FIG. 1;
FIG. 5 is a bottom plan view of the bracelet illustrated in FIG. 1;
FIG. 6 is a left side elevation view of the bracelet illustrated in FIG. 1; [and,]
FIG. 7 is a right side elevation view of the bracelet illustrated in FIG. 1*;*
*FIG. 8 is a front left top perspective view of a bracelet;*
*FIG. 9 is a front elevation view of the bracelet illustrated in FIG. 8;*
*FIG. 10 is a rear elevation view of the bracelet illustrated in FIG. 8;*
*FIG. 11 is a top plan view of the bracelet illustrated in FIG. 8;*
*FIG. 12 is a bottom plan view of the bracelet illustrated in FIG. 8;*
*FIG. 13 is a left side elevation view of the bracelet illustrated in FIG. 8; and,*
*FIG. 14 is a right side elevation view of the bracelet illustrated in FIG. 8.*
The broken lines illustrate portions of the bracelet, and form no part of the claimed design.

1 Claim, 8 Drawing Sheets

Figure 2:
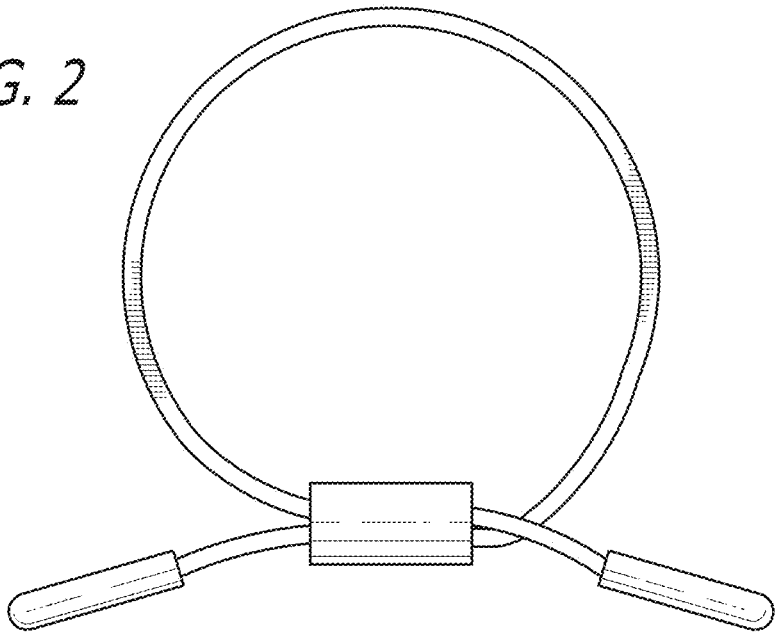
Figure 3:
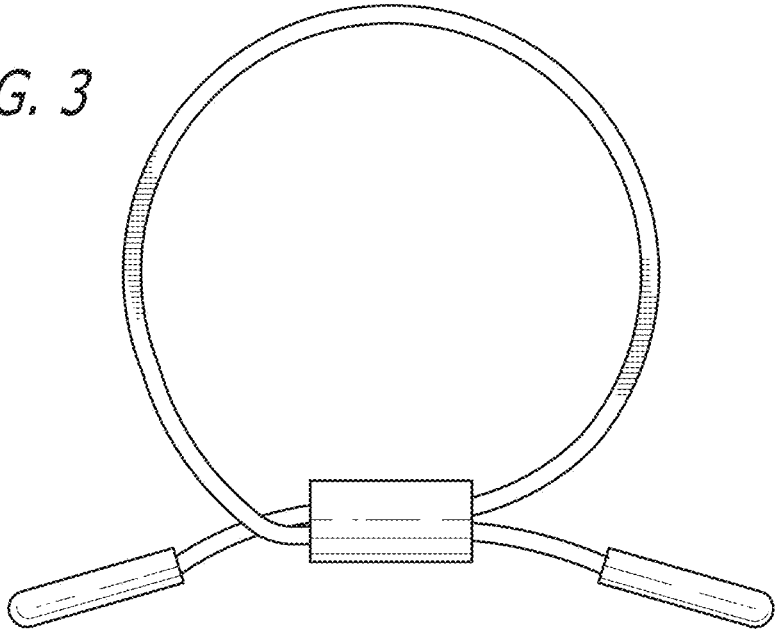
Figure 4:
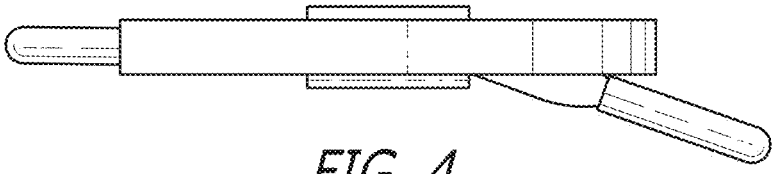
Figure 5:
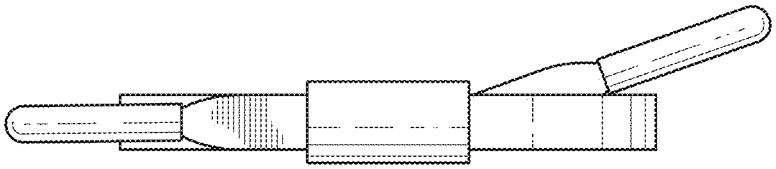
Figure 6:
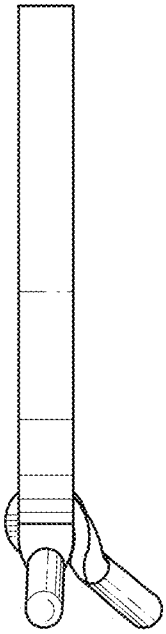
Figure 7:
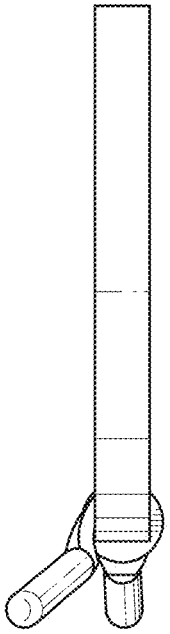

Matter enclosed in heavy brackets [ ] appears in the original patent but forms no part of this reissue; matter printed in italics indicates the additions made by reissue.

AMENDED NEW

(58) Field of Classification Search
CPC ..... A44C 5/00; A44C 5/0007; A44C 5/0015; A44C 5/003; A44C 5/0053; A44C 5/0061; A44C 5/0084; A44C 5/0092; A44C 5/12; A44C 5/14; A44C 5/142; A44C 5/145; A44C 5/16
See application file for complete search history.

(56) References Cited

U.S. PATENT DOCUMENTS

| | | | | | |
|---|---|---|---|---|---|
| D128,297 | S | * | 7/1941 | Healy | D11/5 |
| D149,188 | S | * | 4/1948 | Katz | D11/9 |
| D163,137 | S | * | 5/1951 | Philippe | D11/8 |
| D163,991 | S | * | 7/1951 | Chernow | D11/8 |
| 3,059,518 | A | * | 10/1962 | Nelson | A43C 1/02 D2/978 |
| D224,257 | S | * | 7/1972 | Lee | D11/4 |
| D414,129 | S | * | 9/1999 | Clegg | D11/4 |
| D472,180 | S | * | 3/2003 | Lee | D11/26 |
| 6,560,993 | B1 | * | 5/2003 | Bosque et al. | A44C 5/0092 63/15 |
| D479,393 | S | * | 9/2003 | Weitzman | D2/978 |
| D517,442 | S | * | 3/2006 | Polk, III | D11/4 |
| D572,163 | S | * | 7/2008 | Parker | D11/34 |
| D573,055 | S | * | 7/2008 | Galloway | D11/5 |
| D573,056 | S | * | 7/2008 | Sterling | D11/11 |
| D576,511 | S | * | 9/2008 | Cunningham | D11/8 |
| D591,634 | S | * | 5/2009 | Gorman | D11/4 |
| D604,941 | S | * | 12/2009 | Mouton | D2/978 |
| D606,296 | S | * | 12/2009 | Mouton | D2/978 |
| D655,637 | S | * | 3/2012 | Calderone | D11/3 |
| 8,225,626 | B1 | * | 7/2012 | Blau | G09F 3/005 63/3 |
| D681,498 | S | * | 5/2013 | Kornerup | D11/16 |
| D684,496 | S | * | 6/2013 | Haimoff | D11/3 |
| D712,294 | S | * | 9/2014 | Wright | D04D 1/02 D11/1 |
| D713,283 | S | * | 9/2014 | Nghiem | D11/3 |
| D719,044 | S | * | 12/2014 | Kasidi | D11/5 |
| D723,966 | S | * | 3/2015 | Kasidi | D11/5 |
| D738,771 | S | * | 9/2015 | Devries | D11/3 |
| D754,021 | S | * | 4/2016 | Nyaggah | D11/5 |
| 9,301,580 | B1 | * | 4/2016 | Rafaelian | A44C 5/22 |
| D765,535 | S | * | 9/2016 | Nyaggah | D11/5 |
| D779,998 | S | * | 2/2017 | Rosenbaum | D11/5 |
| D792,262 | S | * | 7/2017 | Rosenbaum | D11/5 |
| D823,708 | S | * | 7/2018 | Tsai | D11/2 |
| D827,479 | S | * | 9/2018 | Saiger | D11/5 |
| D836,016 | S | * | 12/2018 | Billington | D11/3 |
| 10,278,459 | B2 | * | 5/2019 | Stewart | A44C 5/0053 |
| D888,368 | S | * | 6/2020 | Hyera | D2/859 |
| 2005/0199000 | A1 | * | 9/2005 | Grinstead | A44C 5/0015 63/11 |
| 2011/0048072 | A1 | * | 3/2011 | Mullen | A44C 5/025 63/3.1 |
| 2016/0262503 | A1 | * | 9/2016 | Rizzuto | A44C 5/0007 |
| 2016/0278463 | A1 | * | 9/2016 | Stevenson | A41F 19/00 |
| 2019/0029348 | A1 | * | 1/2019 | Stevenson | A41F 19/00 |
| 2019/0029374 | A1 | * | 1/2019 | Goldberg | A44C 5/208 |
| 2019/0239601 | A1 | * | 8/2019 | Frietsch | A44C 5/003 |

OTHER PUBLICATIONS

Rastaclat Facebook page, "Yatta Classic Bracelet" published on Jun. 19, 2016, online. Site visited on Jul. 28, 2020. Internet URL:< "https://www.facebook.com/RastaclatBrand/photos/a. 248566711904028/105410637 4683387 /"> (Year: 2016).

* cited by examiner

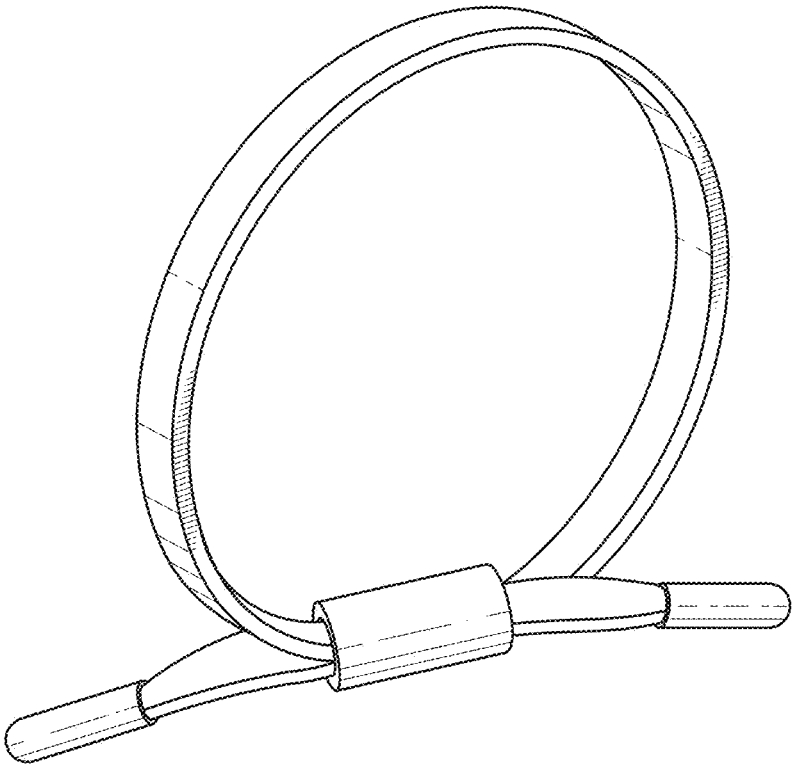
FIG. 1
AMENDED

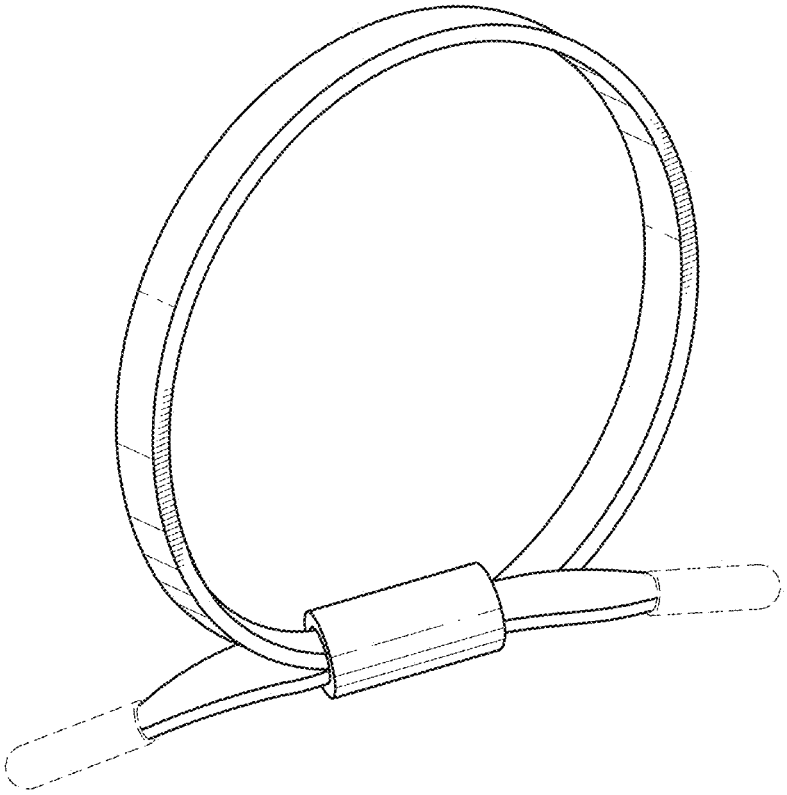
FIG. 8
NEW

FIG. 9
NEW
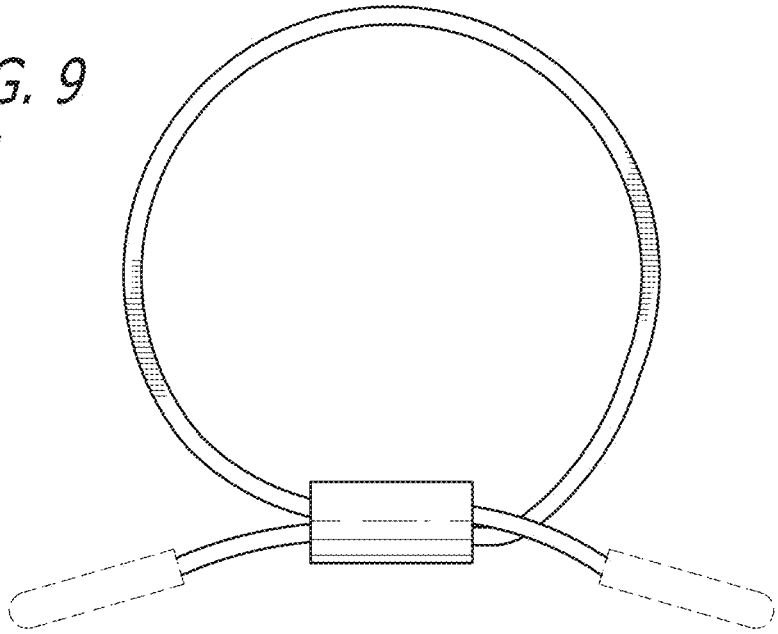
FIG. 10
NEW
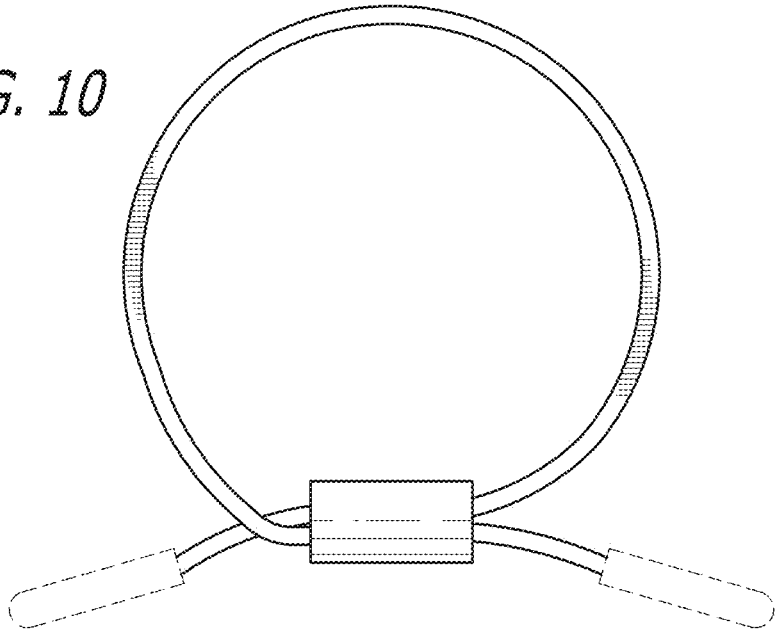

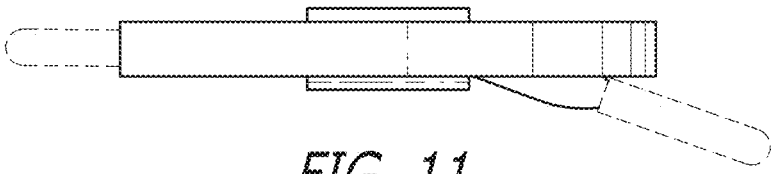
FIG. 11
NEW
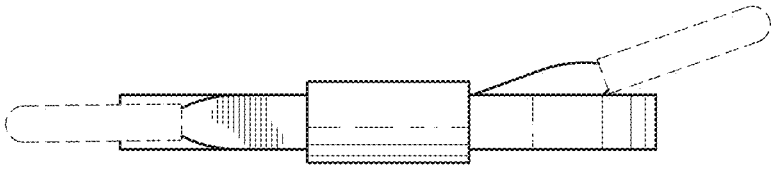
FIG. 12
NEW

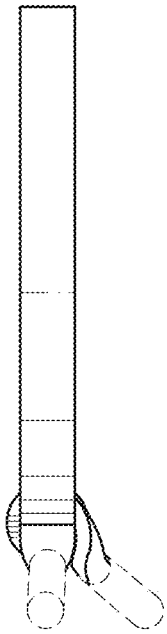
FIG. 13
NEW
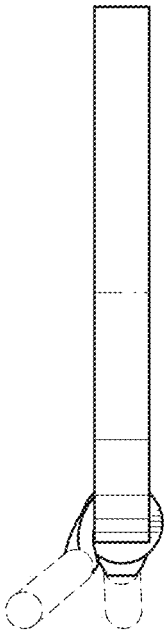
FIG. 14
NEW